R. G. SMITH.
TOOL.
APPLICATION FILED MAR. 2, 1921.
1,418,983.
Patented June 6, 1922.
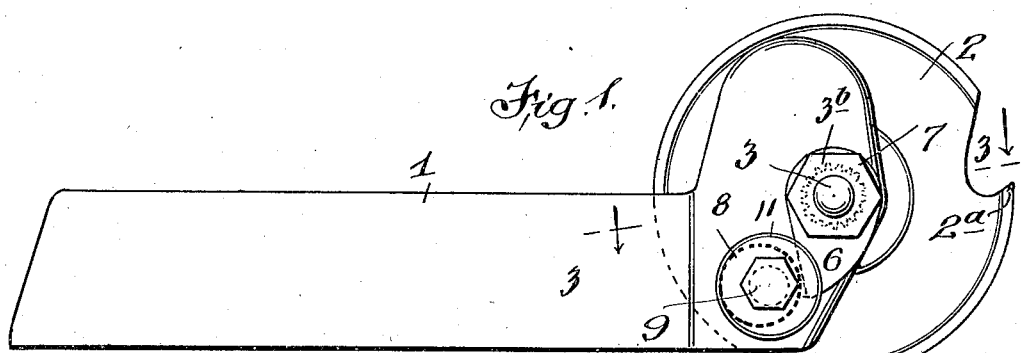
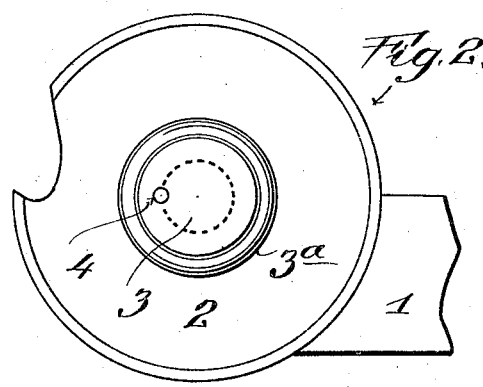
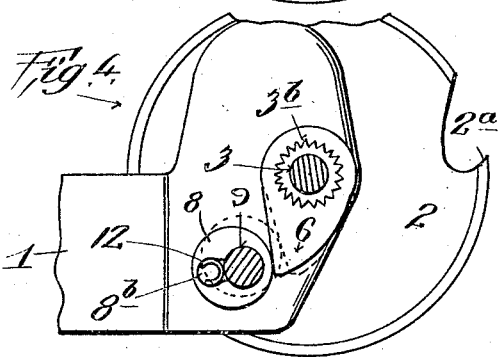
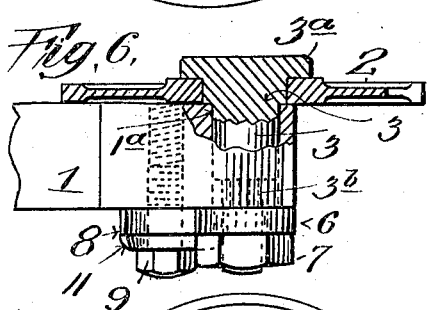
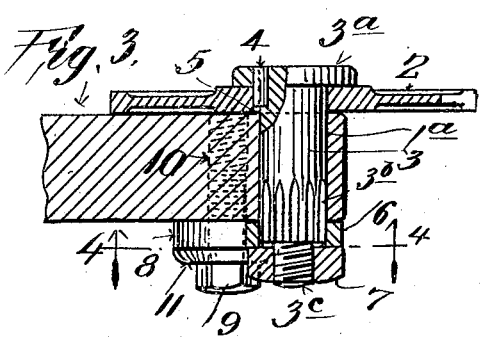
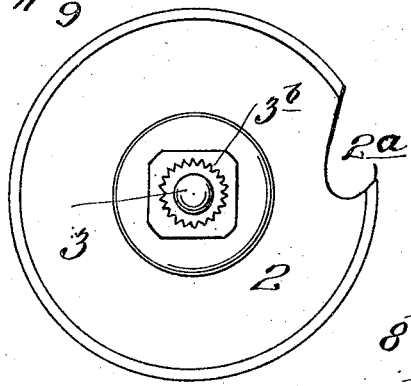
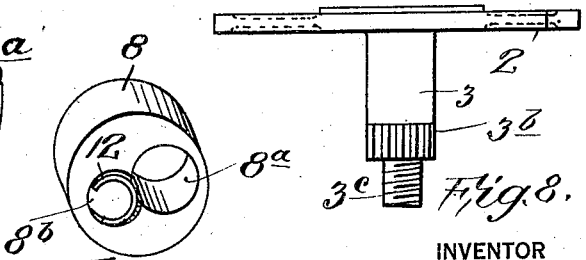
INVENTOR
Robert G. Smith.
BY HIS ATTORNEY
T. F. Bourne

UNITED STATES PATENT OFFICE.

ROBERT G. SMITH, OF NEWARK, NEW JERSEY.

TOOL.

1,418,983.  Specification of Letters Patent.  Patented June 6, 1922.

Application filed March 2, 1921. Serial No. 449,218.

*To all whom it may concern:*

Be it known that I, ROBERT G. SMITH, a citizen of the United States, and resident of Newark, in the county of Essex and State of New Jersey, have invented certain new and useful Improvements in Tools, of which the following is a specification.

My invention relates to cutting tools, especially those to be used in lathes, shapers and planers. My improvements pertain particularly to the class of tools set forth in Letters Patent granted to me February 10, 1920, No. 1,330,403.

The object of my invention is to securely retain a cutter from rotation in its holder during use and to permit rotary adjustment of the cutter respecting its holder to compensate for wear and sharpening.

Details of improvement comprised in my invention will be hereinafter more fully set forth and pointed out in the claims.

Reference is to be had to the accompanying drawings forming part hereof, wherein—

Fig. 1 is a side view of a tool embodying my invention; Fig. 2 is a view looking from the opposite side of Fig. 1; Fig 3 is a section on line 3, 3 of Fig. 1; Fig. 4 is a section on line 4, 4 of Fig. 3; Fig. 5 is a detail perspective of the adjustment member for the cutter; Fig. 6 is a partly sectional detail of a modification; Fig. 7 is an end view of the cutter of Fig. 6; and Fig. 8 is an edge view of a modified cutter.

Similar numerals of reference indicate corresponding parts in the several views.

The numeral 1 indicates a support for a cutter 2, said support being adapted to be held in a tool holder of a lathe, shaper, planer or other analogous machine. Cutter 2 is shown of circular variety having a cutting edge $2^a$. The shank 3 of the cutter may be made separately from the cutter and secured thereto from independent rotation, or said shank may be made integral with the cutter. In the form shown in Figs. 1-4, the shank 3 is cylindrical and passes through a hole in cutter 2, having a head $3^a$ on one side of the cutter, a key or pin 4 entering a keyway or hole 5 formed partly in the central hole of cutter 2 and partly in shank 3 to keep said parts from relative rotation. In Figs. 6 and 7 the shank 3 has a polygonal or squared portion received in a similarly shaped hole in cutter 2 to keep them from relative rotation. In Fig. 8 the cutter 2 and shank 3 are formed integral from a single piece of stock. Shank 3 is removably retained in a transverse hole $1^a$ in support 1 so that the cutter will be located on one side of said support and the free end of shank 3 will project beyond the other side of said support. The outer portion of shank 3 is provided with teeth $3^b$, longitudinally disposed along its surface, to extend beyond the adjacent side of support 1 to receive a projection or finger 6. Said projection is provided with a hole having internal teeth to receive and mesh with the teeth $3^b$ of shank 3 to lock them together from relative displacement rotationally. A nut 7 on the threaded end $3^c$ of shank 3 retains cutter 2, shank 3 and projection 6 on support 1. Projection 6 is adapted to bear against a stop member 8 carried on the side of support 1. Stop member 8 is shown in the form of an eccentric or cam-like disk having a hole $8^a$ off-set from its center to receive a screw 9 that meshes in a threaded hole 10 in support 1. Hole 10 preferably extends through support 1. A washer 11 on screw 9 overlies projection 6 and member 8 to conceal and guide them. By preference member 8 and screw 9 are frictionally connected, for which purpose I provide said member with a recess $8^b$ that opens into hole $8^a$ and receives a spring 12 which bears frictionally against screw 9 to retain the latter and member 8 in set relation and permit their relative rotation.

When my improved tool is to be used the parts are assembled, as shown in Figs. 1 and 3. The cutter is set so that its cutting edge will be in the desired position and member 8 will engage projection 6, the nuts 7 and 9 being set tight. Member 8 will prevent projection 6 from rotating, whereby cutting edge $2^a$ will be retained in proper position, the strain of the work being resisted by projection 6 engaging member 8. When the cutting edge $2^a$ wears or is re-ground member 8 may be rotated or set to engage projection 6 to accommodate the new position of the cutter required. When the cutter has been so much ground away at the cutting edge that member 8 would no longer cooperate with projection 6 with the cutting edge $2^a$ in the proper position the projection 6 may be removed from shank 3 and reset on teeth $3^b$ to bring the projection toward member 8 for the new position of cutting edge $2^a$, the member 8 also being properly set to engage projection 6. The adjustments described may be made, as required, until the cutter has been substantially ground away, from time to time, along its operative cutting portion.

The construction described enables the cutter with its controlling parts to be changed from one side to the other of support, 1, as may be desired, according to the work to be cut, the change of position of said parts being permitted by the holes 1ª and 10 opening through both sides of support 1.

Having now described my invention, what I claim is:—

1. A tool comprising a support, a cutter provided with a shank rigid therewith and rotatively carried by the support, said shank having a projection adjustable relatively thereto, and an adjustable member on the support to cooperate with said projection to resist pressure against the cutting edge of the cutter, said shank and projection having cooperative means to retain them in set relation respecting said member.

2. A tool comprising a support, a cutter provided with a shank rotatively carried by the support, said shank having a projection, and a member having an eccentrically disposed portion adjustably carried on the support to cooperate with said projection to resist pressure against the cutting edge of the cutter.

3. A tool comprising a support, a cutter provided with a shank rotatively carried by the support, said shank having a projection, adjustable around the axis of the shank in different positions relatively thereto, means to retain the shank and projections from relative rotation, and a stop on the support adjustable toward and from the projection to cooperate with said projection to resist pressure against the cutting edge of the cutter.

4. A tool comprising a support, a cutter provided with a shank rotatively carried by the support, said shank having a projection, adjustable around the axis of the shank, means to retain the shank and projection from relative rotation, and a stop having an eccentrically disposed portion adjustably secured on the support to cooperate with said projection to resist pressure against the cutting edge of the cutter.

5. A tool comprising a support, a cutter provided with a shank rotatively carried by the support, said shank having teeth, a projection adjustable around the shank and provided with teeth to cooperate with the teeth of the shank to prevent relative rotation of said parts, and a stop on the shank to cooperate with said projection to resist pressure against the cutting edge of the cutter.

6. A tool comprising a support, a cutter provided with a shank rotatively carried by the support, said shank having teeth, a projection adjustable around the shank and provided with teeth to cooperate with the teeth of the shank to prevent relative rotation of said parts, and an eccentric stop adjustably secured on the support to cooperate with said projection to resist pressure against the cutting edge of the cutter.

7. A tool comprising a support, a cutter provided with a shank rotatively carried by the support, said shank having a projection, an eccentric stop member to cooperate with said projection to resist pressure against the cutting edge of the cutter, and a screw adjustably securing said member on the support.

8. A tool comprising a support, a cutter provided with a shank rotatively carried by the support, said shank having a projection, an eccentric stop member to cooperate with said projection to resist pressure against the cutting edge of the cutter, a screw adjustably securing said member on the support, said member having a recess, and a spring in said recess cooperative with said screw.

Signed at New York city, in the county of New York, and State of New York, this 28th day of February, A. D. 1921.

ROBERT G. SMITH.